Patented July 29, 1952

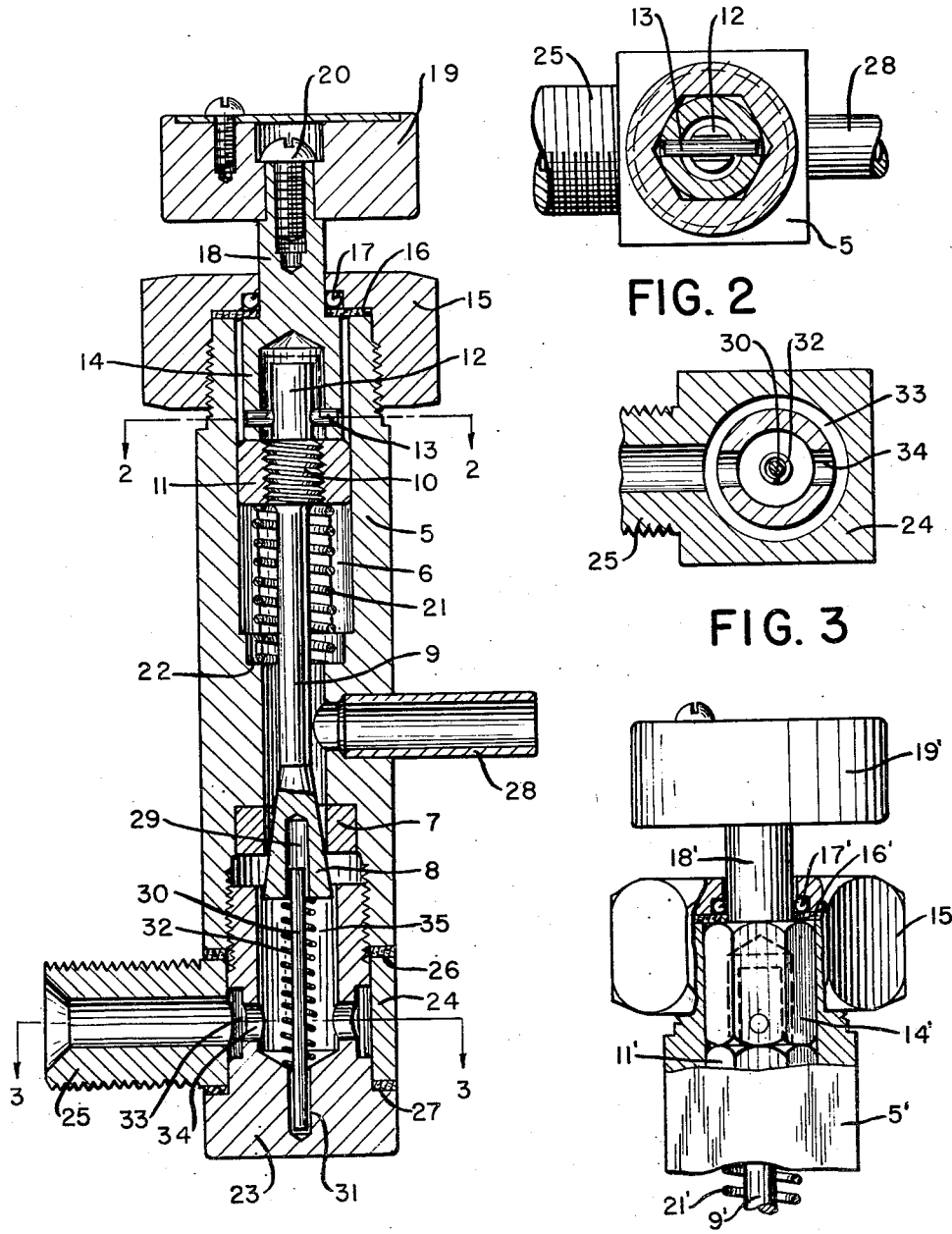

2,605,077

UNITED STATES PATENT OFFICE 2,605,077

COMBINED NEEDLE AND FLUSH VALVE ASSEMBLY

Wayne W. Hay, Madison, Wis., assignor to Air Reduction Company, Incorporated, New York, N. Y., a corporation of New York Application December 5, 1947, Serial No. 789,922

8 Claims. (Cl. 251—20)

This invention relates to valves and more particularly to a combined needle and quick acting or flush valve, the same structure being adapted to perform the function of either type of valve at the will of the operator.

Needle valves as heretofore known require precise machining and are quite delicate. Often such valves are injured by careless manipulation such as the application of too much force in closing the valve. Moreover, in many applications of needle valves, it is desirable that a rapid flow of the fluid under control be permitted at intervals. Ordinary needle valves include no provision to permit rapid opening of the valve to its greatest capacity.

It is the object of the present invention to provide a valve structure of simple and inexpensive design which functions both as a needle valve and as a flush valve.

Another object of the invention is to provide a valve structure which cannot be damaged by careless operation.

A further object of the invention is the provision of a valve structure which is self-aligning and therefore easily manufactured, sturdy and reliable.

Other objects and advantages of the invention will be apparent as it is better understood by reference to the following specification and the accompanying drawing, in which:

Fig. 1 is a longitudinal section through the valve;

Fig. 2 is a section on the line 2—2 of Fig. 1;

Fig. 3 is a section on the line 3—3 of Fig. 1; and

Fig. 4 is a longitudinal section through a modified form of the valve.

Referring to the drawing, 5 indicates a valve housing having an internal bore 6, extending therethrough. A valve seat 7 is provided at one end of the housing. It may be of any suitable material, but preferably the valve seat is made of a resilient gasket material such as pressed Nylon to afford lasting wearing qualities. It affords an annular seat adapted to be engaged by the conical end 8 of a valve stem 9 which extends through the housing. The valve stem 9 is threaded at 10 to engage a nut 11, preferably hexagonal in form, and slidably engaging the bore in the housing 5, so that the nut can move longitudinally with respect thereto but cannot be rotated. The valve stem 9 is slotted at its upper end 12 to receive a pin 13, secured in a yoke 14 which extends through a cap 15, threadedly secured to the housing 5. A gasket 16 and a resilient gasket 17 are provided to prevent leakage of fluid between the cap 15 and the stem 18 of the yoke 14. A hand wheel 19 is secured by a screw 20 to the stem 18, permitting manipulation of the yoke. A spring 21 is disposed beneath the nut 11 and rests on a shoulder 22 within the housing 5. The spring 21 normally holds the conical end 8 of the valve stem 9 against the seat 7, thereby closing the valve.

The lower end of the housing 5 is closed by a plug 23 which is threaded in the housing. It clamps an annular member 24 carrying a threaded inlet nipple 25 firmly in position. Gaskets 26 and 27, disposed between the housing and the annular member 24, and between the annular member 24 and the plug 23, prevent leakage of fluid from the housing. This arrangement permits angular adjustment of the inlet nipple 25 with respect to the outlet 28 which is secured in the wall of the housing 5 and facilitates assembly of the valve with pipes (not shown) connected thereto. As will be readily understood, by loosening the plug 23, the annular member 24 and the nipple 25 may be moved about the axis of the housing 5 to any desired position.

The tapered end 8 of the valve stem 9 is bored at 29 to receive loosely a pin 30 which extends into a bore 31 in the plug 23. The pin limits the movement of the valve stem 9 and supports a spring 32 which surrounds the pin 30, bearing against the plug 23 and against the end of the valve stem 9, thus tending to lift the valve stem so that if the threads 10 are disengaged from the nut 11, they will be readily picked up again when the valve stem is turned.

The force exerted by the spring 32 need be only enough to return the valve stem 9 to a position where the reengagement of the threads 10 can be achieved after disengagement has occurred. Hence, it will be seen that the entire sealing force may be supplied by the spring 21 and supplemented by the unbalanced fluid pressure exerted over the area of the hole in the valve seat 7. The dimensions of the housing 5, the yoke 14, the stem 9, and the nut 11 are selected to preclude the possibility of reducing the distance from the shoulder 22 (in the housing 5) to the proximal face of the nut 11 to the solid compressed length of the spring 21. Thus it is impossible to manually apply mechanical sealing forces greater than those available from the springs 21 and 32, thereby eliminating the most frequent cause of failure of needle valves.

The play between the slot in the upper end of the valve stem 9 and the pin 13 and between the nut 11 and the walls of the bore 6, together with the loose connection between the pin 30 and the bore 29 of the tapered end 8 of the valve stem permits sufficient lateral movement of the tapered end 8 to permit self-alignment of it relative to the valve seat 7 when the tapered end is drawn against the valve seat.

In the operation of the device, the hand wheel 19 is turned in the proper direction, depending upon whether left or right hand threads are provided in the nut 11. When turned in the proper direction, the valve stem 9 is advanced by reason of the threaded connection with the nut 11 which cannot turn, and the conical end 8 is moved away from the seat 7, thus opening the valve to the desired extent to permit the flow of fluid from the nipple 25 through an annular passage 33 and openings 34 into the central bore 35 of the plug 23. The fluid passes the valve seat 7 and thence out to the outlet 28. The valve stem may be advanced in the manner indicated until the threads 10 thereon leave the nut 11. If the threads are thus disengaged, upon reversal of the hand wheel 19 they will be re-engaged as a result of the action of the spring 32.

The valve may be thus set to provide a desired rate of flow within its capacity, and the flow will remain constant. Should it become necessary or desirable to permit the rapid passage of the full volume available through the valve, it is necessary merely to exert pressure on the hand wheel 19, forcing the yoke 14, the nut 11 and the valve stem 9 inwardly to lift the conical end 8 of the valve stem from the valve seat 7. This operation may be performed whether the valve is closed or already partially opened. The full flow will continue as long as the hand wheel 19 is held under pressure. As soon as the hand wheel is released, the spring 21 will move the valve stem 9 backwardly either to its closed position or to the adjusted position at which it has been fixed by rotation in the nut 11. Thus, the flushing action is available quickly and by a simple movement, without disturbing the previous setting of the valve by rotating the hand wheel. Whenever it is desirable to permit full flow to capacity of the fluid through the valve, the operator merely depresses the hand wheel 19 and permits it to return to its previous setting when the full flow is no longer needed.

Motion of the flared end 8 of the valve stem 9 perpendicular to its axis is limited only by the valve seat 7, by reason of which fact the valve stem is free to align itself with the valve seat in such a manner as to achieve a perfect seal with the least possible contact force, thereby avoiding injury to or distortion of the valve seat.

Referring to Fig. 4 of the drawing, a modification of the device is shown which is intended to operate only as a quick acting valve. Thus, the hand wheel 19' is connected to the stem 18' of a yoke 14' which is hexagonal in form and slidably mounted in the casing 5'. The yoke cannot be turned. It engages a nut 11' threadedly secured to the valve stem 9'. A spring 21' bears against the lower side of the nut. A cap 15' is secured to the housing 5' and gaskets 16' and 17' are provided to prevent leakage. The remainder of the structure is as shown in Fig. 1 of the drawing except that spring 32 and pin 30 are not required.

In the manipulation of this modified valve, only one operation is possible, that is, pressure may be applied to the hand wheel 19' to move the stem 9' downwardly against the action of the spring 21' to open the valve. Upon release of the hand wheel the valve is returned to closed position. It cannot be adjusted as a needle valve, since it is impossible to rotate the yoke 14' as in the first modification of the invention.

The structure as described is sturdy and efficient. The structure shown in Fig. 1 performs both of the functions of a needle valve and a flush valve by simple manipulation. The structure is such that it cannot be damaged readily by careless operation, and it ensures, therefore, application of the fluid controlled by the valve in the desired manner.

Various changes may be made in the details of the structure as described without departing from the invention or sacrificing the advantages thereof.

I claim:

1. A valve comprising a housing having a valve seat, an inlet and an outlet, a valve stem having a valve member adapted to co-operate with the seat, and means having a driving connection with the valve stem, said means being adjustable longitudinally relative to the valve stem by rotational translation and having a part extending externally of the housing for moving the valve member from the valve seat alternatively by rotational translation or non-rotational translation.

2. A valve comprising a housing having a valve seat, an inlet and an outlet, a valve stem having a valve member adapted to co-operate with the seat, spring means normally holding the valve member against the valve seat, and means having a driving connection with the valve stem, said means being adjustable longitudinally relative to the valve stem by rotational translation and having a part extending externally of the housing for moving the valve member from the valve seat alternatively by rotational translation or non-rotational translation.

3. A valve comprising a housing having a valve seat, an inlet and an outlet, a valve stem having a valve member adapted to co-operate with the seat, means having a driving connection with the valve stem, said means being adjustable longitudinally relative to the valve stem by rotational translation and having a part extending externally of the housing for moving the valve member from the valve seat alternatively by rotational translation or non-rotational translation, and means for centering the valve member relatively to the valve seat.

4. A valve comprising a housing having a valve seat, an inlet and an outlet, a valve stem having a valve member adapted to co-operate with the seat, and means extending externally of the housing and engaging the longitudinally movable member for moving the valve member from the valve seat alternatively by rotational translation or non-rotational translation, said means including a member movable longitudinally of the housing and threadedly engaging the valve stem, a member engaging said longitudinally movable member and extending externally of the housing, and a driving connection between the member which extends externally of the housing and the valve stem which is adjustable longitudinally of the valve stem.

5. A valve comprising a housing having a valve seat, an inlet and an outlet, a valve stem having a valve member adapted to co-operate with the seat, a threaded member, engaging the valve stem, movable longitudinally of the casing, and held against rotation, a spring engaging the threaded member and normally holding the valve member on the valve seat means extending externally of the housing and engaging the longitudinally movable threaded member for alternatively rotating the valve stem in the threaded member or for shifting the threaded member and the valve stem against the pressure of the spring to move the valve member from the valve seat, and a longitudinally driving connection between the member which extends externally of the housing and the valve stem.

6. A valve comprising a housing having a valve seat, an inlet and an outlet, a valve stem having a valve member adapted to co-operate with the seat, a threaded member, engaging the valve stem, movable longitudinally of the casing, and held against rotation, a spring engaging the threaded member and normally holding the valve member on the valve seat, and means, including a yoke and means thereon to engage adjustably with the valve stem, for alternatively rotating the valve stem in the threaded member or for shifting the threaded member and the valve stem against the pressure of the spring to move the valve member from the valve seat.

7. A valve comprising a housing having a valve seat, an inlet and an outlet, a valve stem having a valve member adapted to co-operate with the seat, a threaded member, engaging the valve stem, movable longitudinally of the casing, and held against rotation, a spring engaging the threaded member and normally holding the valve member on the valve seat, and means, including a yoke and a transverse pin thereon to engage adjustably with the valve stem, for alternatively rotating the valve stem in the threaded member or for shifting the threaded member and the valve stem against the pressure of the spring to move the valve member from the valve seat.

8. A valve comprising a housing having a valve seat, an inlet and an outlet, a valve stem having a valve member adapted to co-operate with the seat, a threaded member, engaging the valve stem, movable longitudinally of the casing and held against rotation, a spring engaging the threaded member and normally holding the valve member on the valve seat, means extending externally of the housing and engaging the longitudinally movable member for alternatively rotating the valve stem in the threaded member or for shifting the threaded member and the valve stem against the pressure of the spring to move the valve member from the valve seat, and means for biasing the valve member toward the threaded member.

WAYNE W. HAY.

REFERENCES CITED

The following references are of record in the file of this patent:

UNITED STATES PATENTS

| Number | Name | Date |
|---|---|---|
| 1,406,869 | Jester | Feb. 14, 1922 |
| 1,424,305 | Hofberg | Aug. 1, 1922 |
| 1,455,940 | Stoms | May 22, 1923 |
| 1,542,612 | Collar | June 16, 1925 |
| 1,559,706 | Jennings | Nov. 3, 1925 |
| 1,682,248 | Reid | Aug. 28, 1928 |
| 1,765,162 | Keenan | June 17, 1930 |
| 1,806,462 | Hopkins | May 19, 1931 |
| 1,846,699 | Uhden | Feb. 23, 1932 |
| 1,854,051 | McAndrew | Apr. 12, 1932 |
| 1,935,971 | Wuesthoff | Nov. 21, 1933 |
| 2,354,362 | Burns | July 25, 1944 |